United States Patent
Conner et al.

(10) Patent No.: US 7,262,684 B2
(45) Date of Patent: Aug. 28, 2007

(54) EFFICIENT RKE ENERGY MONITORING STRATEGY

(75) Inventors: Bruce Conner, Ann Arbor, MI (US); John Nantz, Brighton, MI (US); Zoran Kovac, Macomb Township, MI (US); Charles W. Peacock, Canton, MI (US); Rasha M. Ahmed, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 264 days.

(21) Appl. No.: 10/976,409

(22) Filed: Oct. 29, 2004

(65) Prior Publication Data

US 2006/0091996 A1 May 4, 2006

(51) Int. Cl.
G05B 19/00 (2006.01)
(52) U.S. Cl. ............ 340/5.64; 340/5.6; 340/5.1; 340/5.2; 340/10.1; 340/10.34; 340/10.5; 340/825.72; 340/825.69; 340/5.61
(58) Field of Classification Search ............ 340/5.64; 455/343.5
See application file for complete search history.

(56) References Cited

U.S. PATENT DOCUMENTS

| | | | |
|---|---|---|---|
| 4,903,319 A | 2/1990 | Kasai et al. | |
| 5,095,308 A | 3/1992 | Hewitt | |
| 5,305,459 A | 4/1994 | Rydel | |
| 5,828,316 A | 10/1998 | DiCroce | |
| 5,973,611 A | 10/1999 | Kulha et al. | |
| 6,091,343 A * | 7/2000 | Dykema et al. | 340/825.69 |
| 6,236,674 B1 * | 5/2001 | Morelli et al. | 455/343.5 |
| 6,243,007 B1 | 6/2001 | McLaughlin et al. | |
| 6,323,566 B1 | 11/2001 | Meier | |
| 6,396,412 B1 * | 5/2002 | Banas | 340/5.64 |
| 6,658,328 B1 | 12/2003 | Alrabady et al. | |
| 6,744,357 B2 * | 6/2004 | Itou et al. | 340/572.1 |
| 6,816,081 B1 * | 11/2004 | Okada et al. | 340/5.64 |
| 2001/0010491 A1 | 8/2001 | Mameweck et al. | |
| 2001/0038328 A1 | 11/2001 | King et al. | |
| 2004/0037365 A1 | 2/2004 | King et al. | |

FOREIGN PATENT DOCUMENTS

| | | |
|---|---|---|
| EP | 1179254 | 9/2001 |
| EP | 1337048 | 8/2003 |
| JP | 07250383 | 9/1995 |

* cited by examiner

Primary Examiner—Brian Zimmerman
Assistant Examiner—Vernal Brown
(74) Attorney, Agent, or Firm—MacMillan, Sobanski & Todd, LLC

(57) ABSTRACT

A method is provided for selectively providing power to at least one component of a vehicle-based receiver module for determining the presence and validity of a transmitted RF signal. The RF signal is a request signal for activating a respective vehicle accessory function. Power is provided to a receiver for a first period of time. The receiver is operated to receive any RF signal that may be present from a remote transmitting device. A received signal strength indicator (RSSI) associated with operating the receiver is determined. A determination is made whether the RSSI is greater than a first predetermined threshold. The power is terminated to the receiver after the first period of time if the RSSI is not greater than the first predetermined threshold.

11 Claims, 3 Drawing Sheets

EFFICIENT RKE ENERGY MONITORING STRATEGY

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to selectively providing power to at least one component of a vehicle-based control module for determining the presence and validity of a RF signal transmitted by a remote device.

2. Description of the Related Art

Remote vehicle entry transmitters are used for performing a wireless operation on a vehicle such as locking and unlocking a door, unlatching a trunk latch, or activating or deactivating an alarm system equipped on the vehicle. These remote entry devices are commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle.

The RKE fob transmits a RF signal to a keyless entry module located within the vehicle. The keyless entry module receives the transmitted RF signal and determines the validity of the signal. If the RF signal is validated, then one of the vehicle entry functions is activated. In determining whether the RF signal is valid, bits of data transmitted in the RF signal are transmitted to a microcontroller via a communication line for processing and determining the validity of the RF signal. During an engine-on condition, power supplied to the keyless entry module is supplied by a vehicle alternator so power utilized by the keyless entry module to monitor for a RF signal is not an issue with power consumption. However, during engine off conditions, the battery is used to power the keyless entry module which if constantly on, would cause a drain on the battery.

Typically, to reduce the current consumption of the receiver and the microcontroller (i.e., of the RKE) while awaiting receipt of a transmitted signal for processing, the receiver and microcontroller enter a sleep state. The receiver and the microcontroller are woken from the sleep state on a periodic basis to check for and the validity of a received RF signal. Typically the receiver is on for a duration of time 4 msec to receive a RF signal and to transmit the RF signal to the microcontroller while allowing the bits to stabilize so that a determination can be made that the RF transmission is valid. The receiver and controller then re-enter the sleep state until a next timed wake-up is required for monitoring for a next incoming RF signal. A strobing circuit supplies the power to the receiver and the microcontroller for energizing the receiver and microcontroller from the sleep state so that an RF signal may be received, processed, and validated.

In a remote keyless entry system, for the majority of the time that a receiver is in an energized state no transmitted RF signal will be received. This is due to the infrequent activation of a vehicle entry transmitter. However, the receiving circuit must be continuously energized for those few occurrences when a RF signal is transmitted. As stated earlier, the strobing circuit periodically energizes the receiving circuit for energy conservation as opposed to providing a constant flow of current to the receiving circuit. The strobing circuit will provide the same amount of current during each wakeup state regardless if a transmitted RF signal is present or not present. This is required so that when a RF signal is transmitted and received the proper amount of time is allocated for processing the RF signal and for making the determination of the RF signal's validity. Periodically energizing the receiver for a respective duration that is sufficient to process a RF signal results in unnecessary power consumption during those periods when a signal is not received.

SUMMARY OF THE INVENTION

The present invention has the advantage of reducing the on time of a receiver which results in minimizing the power consumption of the receiver by determining the presence of an RF signal and by determining if the RSSI is above a first predetermined threshold.

A method is provided for selectively providing power to at least one component of a vehicle-based receiver module for determining the presence and validity of a transmitted RF signal. The RF signal is a request signal for activating a respective vehicle accessory function. Power is provided to a receiver for a first period of time. The receiver is operated to receive any RF signal that may be present from a remote transmitting device. A received signal strength indicator (RSSI) associated with operating the receiver is determined. A determination is made whether the RSSI is greater than a predetermined threshold. The power is terminated to the receiver after the first period of time if the RSSI is not greater than the predetermined threshold.

DETAILED DESCRIPTION OF PREFERRED EMBODIMENTS

Figure 1:
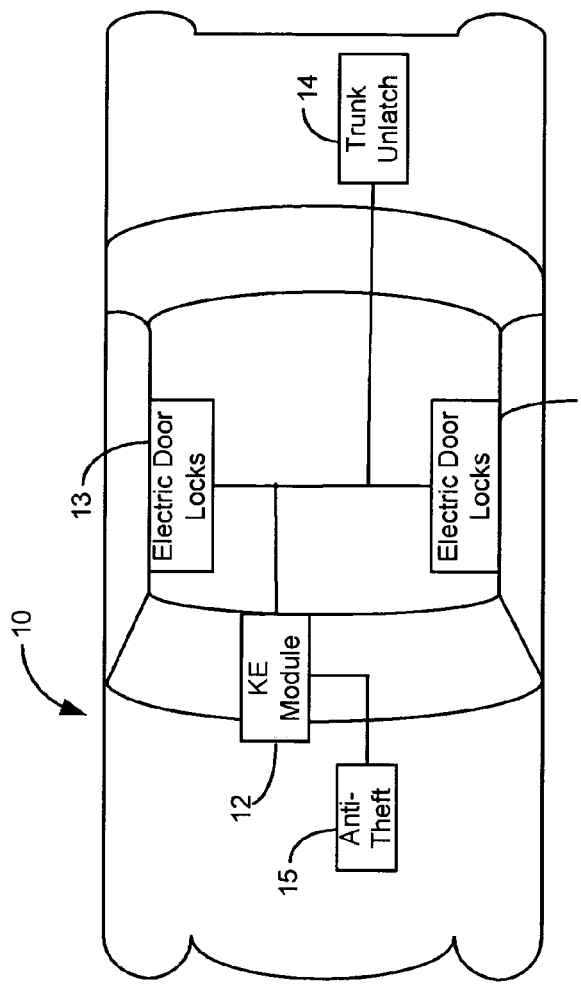
FIG. 1 is a perspective view of a vehicular remote keyless entry system according to an embodiment of the present invention.
Figure 1:
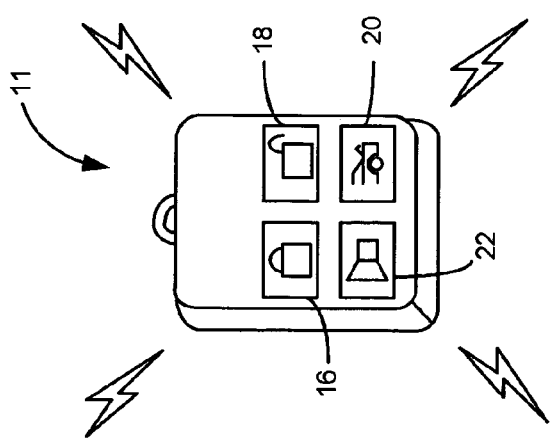

FIG. 1 shows a remote vehicle interface device such as a transmitter 11 (e.g., RKE fob) for broadcasting RF signals to a keyless entry module 12 located within a vehicle 10 for actuating vehicle entry functions such as unlocking and locking a vehicle door 13, unlatching a trunk latch 14, and for activating and deactivating a vehicle alarm system 15. A vehicle lock switch 16 and a vehicle unlock switch 18 are commonly disposed on a face of the RKE fob. The RKE fob may further include a trunk unlatch switch 20 and a alarm switch 22 for activating and deactivating a vehicle alarm. Based on the sensitivity of a receiver within the keyless entry module 12 a RF signal is received when the vehicle 10 (i.e., keyless entry module 12) is within the broadcasting range of the RKE fob. The keyless entry module 12 determines the validity of the RF signal broadcast by the RKE fob for actuating vehicle entry functions.

Figure 2:
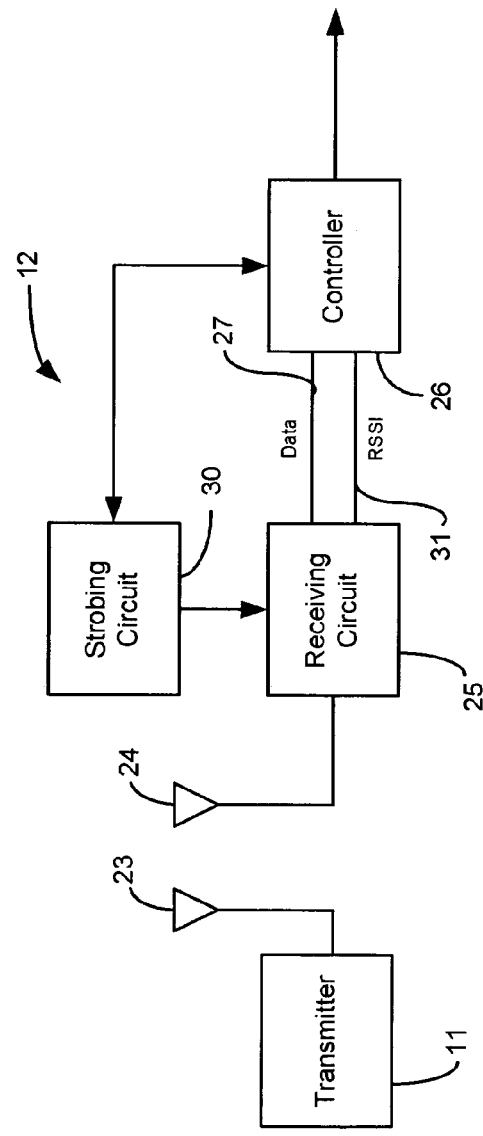
FIG. 2 is a block diagram of a vehicular remote keyless entry system according to an embodiment of the present invention.

FIG. 2 illustrates a block diagram of an RKE system that selectively determines the duration of the awaken state of a receiver for minimizing the on time of the receiver. The keyless entry module 12 is shown to include a receiving circuit 25 and a controller 26 for receiving and processing RF signals from the transmitter 11 for actuating a vehicle entry function. The controller 26 is preferably a microcontroller. The transmitter 11 transmits the RF signal via antenna 23. A strobing circuit 30 provides power to energize the receiving circuit 25 for receiving the RF signal. If a respective RF signal is transmitted while the receiving circuit 25 is powered and within the receiving range of the receiving circuit 25, the respective RF signal is received via antenna 24. In addition, the strobing circuit 30 may also provide power to the controller 26 for processing and determining the validity of the RF signal. The strobing circuit 30 supplies power to the receiving circuit 25 for a first period of time. The first period is of a sufficient duration for the receiving circuit 25 to determine the signal strength of the received RF signal (e.g. 1.5 msec). The receiving circuit 25 generates a received signal strength indicator (RSSI) signal and transmits the RSSI signal to the controller 26. The RSSI signal is indicative of the power of any received RF signal. The RSSI signal is provided to the controller 26 via a dedicated RSSI line 31. If no nearby transmitter is broadcasting, the RSSI signal has a very low value. Alternatively, if a nearby transmitter is broadcasting within the receiving range of the receiver, then the RSSI signal has a very high value.

The controller 26 receives the RSSI signal and compares the RSSI signal with a first predetermined threshold value stored in memory for determining whether the received RF signal has a signal strength that is equal to or greater than an expected signal strength of a typical vehicle entry transmitted RF signal. During conditions when a strong RF signal is received, this comparison allows the controller 25 to quickly screen out any signal that does not have the common attribute (i.e., signal strength) that is typically expected of a vehicle entry RF signal. As stated earlier, known RKE systems require a respective receiving circuit to be energized for a duration of time to allow the respective receiving circuit to demodulate a respective RF signal and transfer the demodulated information to a respective controller while allowing the bits to stabilize so that the respective controller can process the data for determining whether the received RF signal is valid. Since the respective receiving circuit is energized during this duration of time regardless if a RF signal is present or not, a respective amount of power is consumed over this duration of time every time the respective receiving circuit is in an awake state. The present invention minimizes the amount of power consumed by the receiver circuit 25 by reducing the on-time of the receiver circuit 25 in those instances when no receivable RF signal is present (i.e., most of the time). When a received RF signal is present, the power is continuously supplied for maintaining the awake state and allowing the signal to be checked for validity.

During the awake state, if the RSSI signal is less than the first predetermined threshold, the controller 26 determines that no vehicle entry RF signal is present and a first signal is provided to the strobing circuit 30 to terminate the power provided to the receiving circuit 25 after the first period of time has elapsed. If the controller 26 determines that the RSSI signal is equal to or greater than the first predetermined threshold, then the controller proceeds forward in determining the validity of the received RF signal. The controller 26 transmits a second signal to the strobing circuit 30 to energize the receiving circuit 25 for an extended period of time. The extended period time is of a sufficient duration for the receiving circuit 25 to demodulate the RF signal and transfer the demodulated information to the controller 26 via the data line 27 while allowing the bits to stabilize so that a determination can be made as to the validity of the RF signal. If the controller determines that the RF signal is valid, then the controller 26 generates a control signal over a communication bus 31 for actuating a respective vehicle accessory.

During conditions when a weak RF signal is received, a first predetermined threshold set too high may prevent the system from determining the presence of the weak RF signal. However, setting the first predetermined threshold too low may allow noise present within the receiving circuit (i.e., when no RF signal is present) to exceed the first predetermined threshold thereby incorrectly indicating the presence of a RF signal. This would result in extending the period of time for powering the receiving circuit and controller thereby consuming more energy when it is not required.

To determine whether a weak signal or noise is present within the receiving circuit, a second predetermined threshold is applied whereas the second predetermined threshold is lower than the first predetermined threshold. If the RSSI signal is less than the second predetermined threshold, then a determination is made that no RF signal is present. If the RSSI signal is less than the first predetermined threshold but greater than the second predetermined threshold, then a weak RF signal or noise may be present. To determine whether noise or a weak signal is present, the RSSI signal is sampled by an A/D input on the controller and continuous samples are taken for a short duration of time. A noise characterization parameter is then determined based on the sampled measurements for determining whether to extend the awake time period for powering the receiver and controller or to terminate the power after the first period of time.

In a preferred embodiment, the noise characterization parameter is a signal differential that is determined by sampling the RF signal and determining the differential between a high peak value of the RF signal and a low peak value of the RF signal over a duration of time. If this high/low value differential is greater than a predetermined signal differential, then a determination is made that a RF signal is present and power is extended to the receiver and controller for the extended period of time. If only noise (i.e., less the RF signal) is present in the receiver then the differential between the high and low peak values are much smaller in comparison to when a weak RF signal is present and power is terminated at the end of the first period of time.

Alternatively, the noise characterization parameter may be determined by measuring the RSSI at different time intervals over a duration of time for determining the average signal strength over each time interval. At least two RSSI measurements are taken over the duration of time and the high average RSSI value and the low average RSSI value are compared. A comparison between the average RSSI values having a small differential results in a determination that no RF signal is present and power is terminated at the end of the first period of time. Average RSSI values having a large differential results in a determination that the RF signal is present and power is extended for the extended period of time.

In another preferred embodiment, the transmitter 11 may include a pressure sensor disposed in a vehicle tire for transmitting a RF signal containing tire pressure data to the RKE keyless entry module 12. The keyless entry module 12 may include further functionality for monitoring data retrieved from the tire pressure sensor for determining the pressure within each of the vehicle tires and providing warnings when the tire pressure is low.

Figure 3:
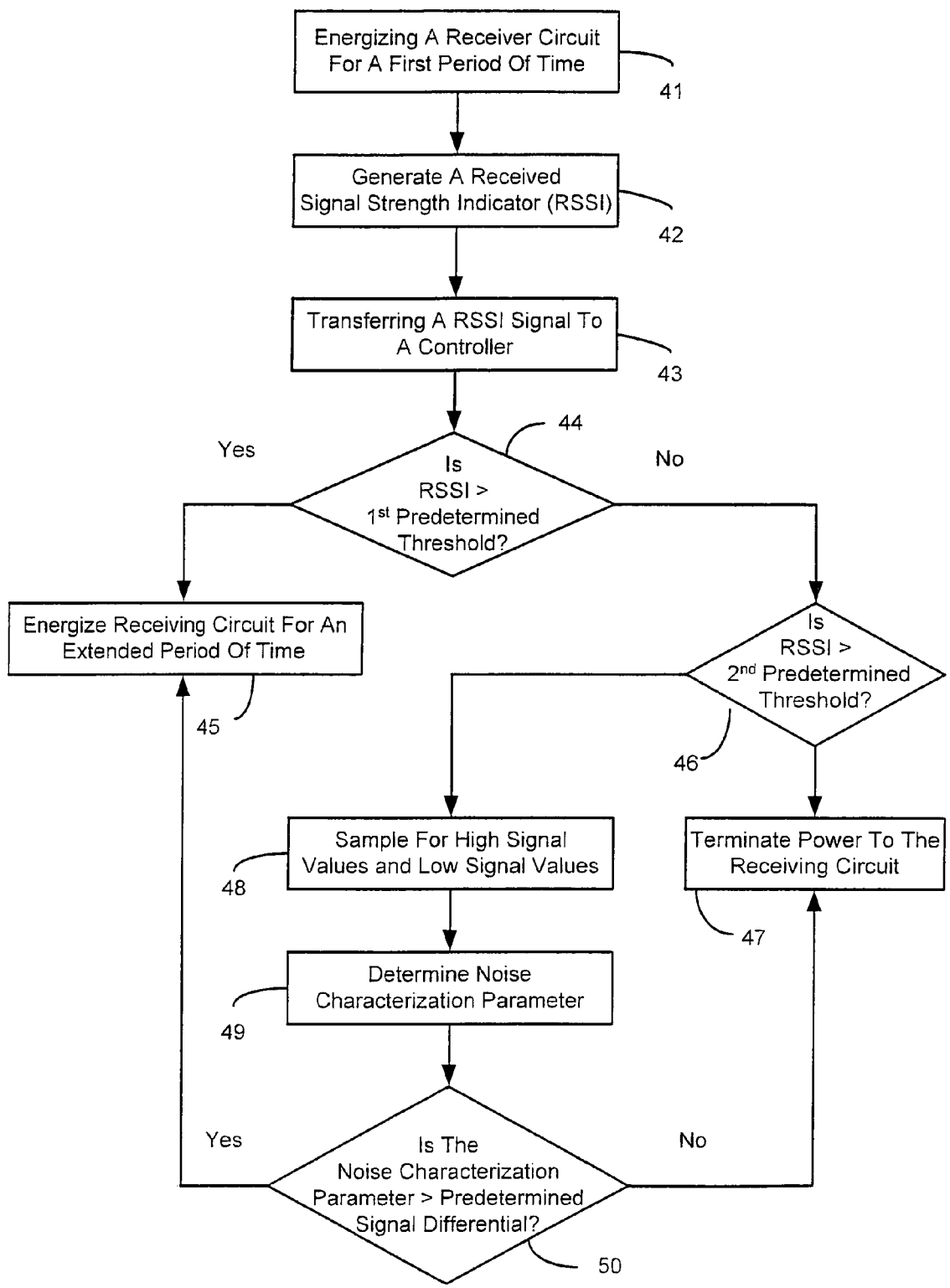
FIG. 3 is a flowchart for minimizing the power consumption of the receiving circuit according to a first embodiment of the present invention.

FIG. 3 illustrates a method for selectively energizing a receiving circuit for reducing the amount of energy required to monitor and detect the presence of a received RF signal for activation of a vehicle accessory. In step 41, a strobing circuit energizes the receiving circuit for a first period of time for entering an initial awake state. The receiving circuit includes an antenna for receiving a transmitted RF signal when the receiving circuit is in the awake state. Preferably, the first period of time that the receiving circuit is energized in the awake state is about 1.5 msec. The period of time that the receiving circuit is in a sleep state is about 36 msec. Alternatively, various wake times as well as sleep state times may be used without departing from the scope of the invention. To minimize the amount of time that is required for a controller determine if the RF signal is valid, a determination is first made whether a characteristic of a vehicle entry RF signal is present in the received RF signal rather than decoding the bits of data of the RF signal. In step 42, a RSSI is generated based on the signal strength measured in the receiving circuit while in the awake state. In step 43, a RSSI signal is transferred to the controller via a dedicated RSSI line. In step 44 a determination is made whether the RSSI is greater than a first predetermined threshold value stored in memory. The first predetermined threshold is the minimum signal strength that is expected from a typical vehicle entry transmitted RF signal. If a determination is made that the RSSI is greater than the first predetermined threshold value, then a determination is made that the received RF signal may be a signal intended for vehicle entry activation and the receiving circuit is energized for an extended period of time in step 45. If the determination is made in step 44 that the RSSI value is less than the first predetermined threshold, then a further determination is made to determine whether a weak signal is present in step 46.

In step 46, a determination is made whether the RSSI is greater than a second predetermined threshold. If the RSSI is less than the second predetermined threshold, then power is terminated to the receiving circuit in step 47. If the RSSI is greater than the second predetermined threshold, then the RF signal is sampled to measure for high signal values and low signal values in step 48. Is step 49, a noise characterization parameter is determined. In step 50, a determination is made whether the noise characterization parameter is greater than a predetermined signal differential. If a determination is made that the noise characterization parameter is greater than the predetermined signal differential, then a determination is made that the received RF signal may be a signal intended for vehicle entry activation and the receiving circuit is energized for an extended period of time in step 45, If the noise characterization parameter is not greater than the predetermined signal differential, then power is terminated to the receiving circuit in step 47.

Figure 4:
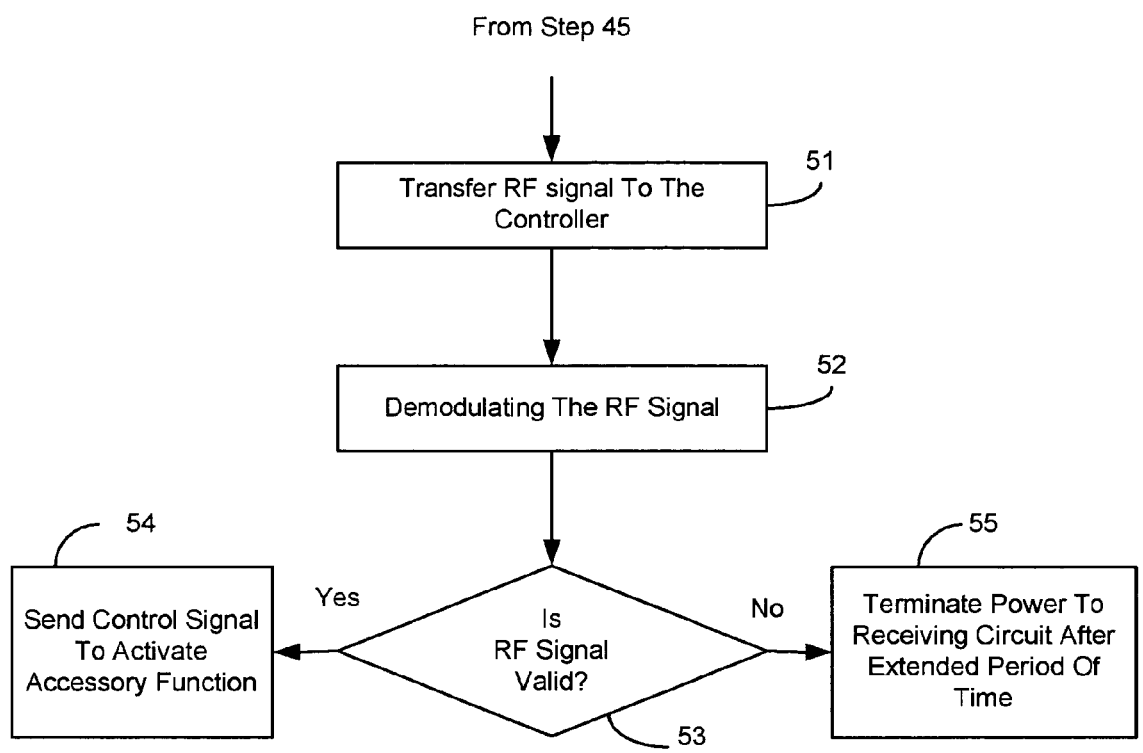
FIG. 4 is a flowchart for processing and validating a RF signal according to a second embodiment of the present invention.

FIG. 4 illustrates a method for determining the validity of a received RF signal and actuating a vehicle entry function in response thereto. In step 51, the RF signal is transferred to the controller allowing the bits of data from the RF signal to stabilize for demodulating the RF signal. In step 52, the controller demodulates the RF signal to determine the validity of the RF signal. In step 53, a determination is made whether the RF signal is valid. If a determination is made that the RF signal is valid, a control signal is provided to activate a vehicle accessory in step 54. If the determination is made in step 53 that the RF signal is not valid, then the power to the receiving circuit is terminated after the extended period of time elapses in step 55.

What is claimed:

1. A method for selectively providing power to at least one component of a vehicle-based receiver module for determining the presence and validity of a transmitted RF signal, said RF signal is a request signal for activating a respective vehicle accessory function, said method comprising the steps of:

providing said power to a receiver for a first period of time;

operating said receiver to receive any RF signal that may be present from a remote transmitting device;

determining a received signal strength indicator (RSSI) associated with a received RF signal; and if said RSSI is between a first predetermined threshold and a second predetermined threshold, then determining a noise characterization parameter;

if said RSSI is greater than said first predetermined threshold then automatically providing said power to said receiver for an extended period of time; and if said RSSI is less than said second predetermined Threshold ten automatically terminating said power to said receiver.

2. The method of claim 1 wherein if said RSSI is between said first and second threshold, then terminating said power to said receiver in response to said noise characterization parameter.

3. The method of claim 1 wherein if said RSSI is between said first and second threshold, then providing power to said receiver for an extended period of time in response to said noise characterization parameter.

4. The method of claim 1 wherein said noise characterization parameter is determined by sampling said RF signal over a duration of time and determining a differential between a high peak value and a low peak value of said sampled RF signal.

5. The method of claim 1 wherein said noise signal characterization parameter is determined by sampling at least two RSSI measurements over a duration of time and determining a differential between a high RSSI value and a low RSSI value of said sampled RF signal.

6. A control system for energizing at least one component within a vehicle-based control module for a selective duration of time for determining a presence and validity of a RF signal for actuating a vehicle accessory, said control system comprising:

a receiver for receiving an RF signal and generating an RSSI signal corresponding to said RF signal;

a controller for determining said presence of said RF signal in response to said RSSI signal and for determining said validity of said RF signal; and a strobe circuit for providing power to said receiver;

wherein said strobe circuit terminates said power to said receiver if said controller determines that said RSSI signal is less than a second predetermined threshold;

wherein said strobe circuit terminates said power to said receiver if said controller determines that said RSSI signal is between a first predetermined threshold and a second predetermined threshold and in response to a noise characterization parameter;

wherein said strobe circuit provides said power to said receiver for an extended period of time so said controller can determine said validity of said RF signal if said RSSI signal is greater than said first predetermined threshold; and wherein said strobe circuit provides said power to said receiver for an extended period of time so said controller can determine said validity of said RF signal in response to said noise characterization parameter.

7. The system of claim 6 wherein said first period of time includes 1.5 msec.

8. The system of claim 6 wherein said vehicle-based control module includes a keyless entry module for activating a vehicle entry function.

9. The system of claim 6 wherein said vehicle-based control module includes a tire pressure sensing module for monitoring fire pressure.

10. The system of claim 6 wherein said strobe circuit provides said power energy to said controller during said first period of time.

11. The system of claim 6 wherein said strobe circuit provides said power energy to said controller during an extended period of time.

* * * * *